US008619886B2

(12) United States Patent
Nsenga et al.

(10) Patent No.: US 8,619,886 B2
(45) Date of Patent: Dec. 31, 2013

(54) METHOD AND SYSTEM FOR MIXED ANALOG/DIGITAL BEAMFORMING IN WIRELESS COMMUNICATION SYSTEMS

(75) Inventors: Jimmy Nsenga, Brussels (BE); André Bourdoux, Esneux (BE)

(73) Assignees: IMEC, Leuven (BE); CETIC asbl, Charleroi (BE)

( * ) Notice: Subject to any disclaimer, the term of this patent is extended or adjusted under 35 U.S.C. 154(b) by 172 days.

(21) Appl. No.: 13/112,910

(22) Filed: May 20, 2011

(65) Prior Publication Data

US 2011/0291891 A1 Dec. 1, 2011

Related U.S. Application Data

(60) Provisional application No. 61/347,311, filed on May 21, 2010.

(51) Int. Cl.
*H04K 1/10* (2006.01)
*H04L 27/28* (2006.01)

(52) U.S. Cl.
USPC ............................ 375/260; 375/295; 375/316

(58) Field of Classification Search
USPC ......... 375/259–260, 267, 285, 295–296, 316, 375/340, 346–347; 342/272, 273, 377
See application file for complete search history.

(56) References Cited

U.S. PATENT DOCUMENTS

| 8,064,407 | B2* | 11/2011 | Wang et al. | 370/334 |
| 2006/0029146 | A1* | 2/2006 | Catreux et al. | 375/267 |
| 2012/0032848 | A1* | 2/2012 | Nsenga | 342/373 |

OTHER PUBLICATIONS

Palomar et al., "Joint Tx-Rx Beamforming Design for Multicarrier MIMO Channels: A Unified Framework for Convex Optimization", IEEE Trans. on Signal Proc., vol. 51, pp. 2381-2401, Sep. 2003.
A.P. Iserte, "Joint Beanforming Strategies in OFDM-MIMO Systems", Acoustics, Speech and Signal Processing, in Proc. IEEE ICASSP, vol. 3, pp. 2845-2848, May 2002.
Sanayei et al., "Antenna selection in MIMO system", IEEE Comm. Magazine, vol. 42, pp. 68-73, Oct. 2004.
P.D. Karamalis et al., "Adaptive Antenna Subarray Formation for MIMO Systems", IEEE Trans. Wireless Comm., vol. 5, No. 11, pp. 2977-2982, 2006.
X. Zhang et al., "Variable-phase-shift-based RF-baseband codesign for MIMO antenna selection", IEEE Trans. Signal Processing, vol. 53, pp. 4091-4103, Nov. 2005.
A.F. Molisch et al., "MIMO Systems with Antenna Selection", Microwave Magazine, IEEE ICASSP, vol. 5, pp. 46-56, Mar. 2004.

* cited by examiner

*Primary Examiner* — Jean B Corrielus
(74) *Attorney, Agent, or Firm* — Knobbe Martens Olson & Bear LLP

(57) ABSTRACT

A method is disclosed for mixed analog/digital beamforming in a wireless communication system having transmit and receive antennas and analog front-ends connected to either the transmit antennas or the receive antennas. The method includes determining transmit and receive analog/digital beamforming coefficients by a) determining information representative of communication channels formed between a transmit antenna and a receive antenna, b) defining coefficients representing the transmit analog beamforming coefficients and the receive analog beamforming coefficients, c) determining a beamforming cost function using the information and the coefficients, the cost function taking into account the analog front-ends, d) computing an optimized set of transmit/receive analog beamforming coefficients by exploiting the cost function, e) deriving an estimate of the frequency responses of the communication channels using the information determined in process a, and f) deriving for each channel transmit/receive digital beamforming coefficients using the estimated frequency responses and the optimized beamforming coefficients.

19 Claims, 9 Drawing Sheets

(a) Uncorrelated (b) Spatial correlation 0.2

(a) SC-FDE with QPSK modulation scheme (b) OFDM with QPSK modulation scheme

METHOD AND SYSTEM FOR MIXED ANALOG/DIGITAL BEAMFORMING IN WIRELESS COMMUNICATION SYSTEMS

CROSS REFERENCE TO RELATED APPLICATIONS

This application claims priority under 35 U.S.C. §119(e) to U.S. provisional patent application 61/347,311 filed on May 21, 2010, which application is hereby incorporated by reference in its entirety.

BACKGROUND OF THE INVENTION

1. Field of the Invention

The disclosed technology generally relates to wireless networks and in particular to beamforming transmissions in wireless networks.

2. Description of the Related Technology

The huge bandwidth available in the 60 GHz band allows short-range wireless communications to deliver data rate beyond 1 Gbps. However, the high path loss and low output power of CMOS power amplifiers (PA) at 60 GHz yield poor link budget, making it impossible to support such high data rate with omnidirectional antenna. A key solution to the link budget problem at 60 GHz is to use multiple antenna beamforming, i.e. to smartly combine (beamform) the signals on the various antennas.

The channel capacity of a wireless link can be improved by using multiple antenna technology. The use of this technology is even more interesting at 60 GHz given the small wavelength of about 5 mm, which enables to pack easily a large antenna array in a very small volume. In general, a multiple antenna array can provide three different types of gain: spatial multiplexing (SM) gain, array gain and diversity gain. On the one hand, SM gain is more attractive for bandwidth limited systems that need a very high spectral efficiency to achieve a given data rate. The SM gain is obtained by transmitting independent streams in the eigenmode subchannels of a multiple input multiple output (MIMO) channel. On the other hand, for large bandwidth systems (e.g. the one operating at 60 GHz), both array and diversity gains are more desirable since they improve the channel capacity by increasing the received SNR.

In most existing MIMO wireless systems (e.g. the one operating at 5 GHz), beamforming (BF) processing is carried out in the digital baseband. The resulting digital beamforming (DBF) architecture implies that each antenna has its own analog front-end (AFE) chain plus a digital-to-analog converter (DAC) at the transmitter or an analog-to-digital converter (ADC) at the receiver. An AFE carries out the translation between digital baseband and analog radio frequency (RF). Several algorithms have been already proposed to compute DBF coefficients at both transmit (TX) and receive (RX) sides. Examples are provided in the papers "*Joint Tx-Rx Beamforming Design for Multicarrier MIMO Channels: A Unified Framework for Convex Optimization*" (Daniel P. Palomar et al., IEEE Trans. on Signal Proc., vol. 51, pp. 2381-2401, September 2003) and "*Joint Beamforming Strategies in OFDM-MIMO Systems*" (A. P. Serte, Acoustics, Speech and Signal Processing, in Proc. IEEE ICASSP, vol. 3, pp. 2845-2848, May 2002). Nevertheless, considering that at 60 GHz a wireless system can have an antenna array of more than eight elements, DBF solutions are practically infeasible due to the resulting high cost and power consumption of analog blocks, especially the ADC and the DAC running at several gigasamples per second.

Considering multi-antenna architecture with a lower number of AFE chains than antenna elements, the most used analog spatial processing (ASP) technique is antenna selection (AS), as described e.g. in "*Antenna selection in MIMO system*", (Sanayei et al., IEEE Comm. Magazine, vol. 42, pp. 68-73, October 2004). In this technique, only a small number of antennas (which number is equal to the number of available AFE chains) are used to perform DBF and the other ones are simply not used. However, it has been shown that mixed AS/DBF schemes suffer from severe performance degradations in most fading channels, one reason being that they do not provide BF gain. In order to alleviate the problems of conventional AS schemes in fading channels, an analog beamforming (ABF) technique known as antenna subarray formation (ASF) has been recently introduced. This technique exploits the signals on all available antennas by applying a linear transformation in the analog RF domain. However, the paper "*Adaptive Antenna Subarray Formation for MIMO Systems*" (P. D. Karamalis et al., IEEE Trans. Wireless Comm., vol. 5, no. 11, pp. 2977-2982, 2006) analyzes mixed ABF/DBF techniques at only one side of the transceiver. In "*Variable-phase-shift-based RF-baseband codesign for MIMO antenna selection*" (X. Zhang et al., IEEE Trans. Signal Processing, vol. 53, pp. 4091-4103, November 2005) a joint TX-RX mixed ABF/DBF algorithm has been proposed for only frequency flat MIMO channels. Nevertheless, due to the large bandwidth used at 60 GHz, the channel is likely to be frequency selective.

SUMMARY OF CERTAIN INVENTIVE ASPECTS

Certain inventive aspects relate to a method for mixed analog/digital beamforming in a wireless communication system, wherein jointly transmit-receive mixed analog and digital beamforming weights are computed. They further relate to a transmitter device and receiver device suitable for use in the method.

One inventive aspect relates to a method of mixed analog/digital beamforming in a wireless communication system having a plurality of transmit antennas and receive antennas and a plurality of analog front-ends connected to the plurality of transmit and receive antennas, wherein at least two analog front-ends are connected to either the transmit antennas or the receive antennas. The method comprises the steps of determining transmit and receive analog beamforming coefficients and transmit and receive digital beamforming coefficients by a) determining information representative of communication channels formed between a transmit antenna and a receive antenna of the plurality of antennas, b) defining a set of coefficients representing the transmit analog beamforming coefficients and the receive analog beamforming coefficients, c) determining a beamforming cost function using the information and the set of coefficients, the beamforming cost function taking into account the plurality of analog front-ends, d) computing an optimized set of coefficients by exploiting the beamforming cost function, the optimized set of coefficients comprising optimized transmit analog beamforming coefficients and optimized receive analog beamforming coefficients, e) deriving an estimate of the frequency responses of the communication channels using the information determined in process a), and f) deriving for each communication channel transmit digital beamforming coefficients and receive digital beamforming coefficients using the estimated frequency responses and the optimized transmit and receive analog beamforming coefficients.

In an embodiment the step of determining information representative of communication channels comprises determining a channel pair matrix having elements representative of a channel pair formed between a transmit antenna and a receive antenna of the plurality of antennas.

In an embodiment the step of determining a beamforming cost function taking into account the plurality of analog front-ends comprises the step of bounding the beamforming cost function. A lower bound is thereby set for the first (largest) eigenvalue of the cost function.

In an embodiment the channel pair matrix is defined by $$\Omega = \sum_{k=0}^{N-1} vec(\underline{\tilde{H}}[k])(vec(\underline{\tilde{H}}[k]))^H$$

wherein N denotes the number of communication channels, $\tilde{H}[k]$ represents the frequency domain response of the k-th subchannel, $[.]^H$ stands for the complex conjugate transpose operator and vec denotes a matrix operator for creating a column vector.

In an embodiment the step of defining the set of coefficients representing the transmit and receive analog beamforming coefficients comprises defining a joint transmit and receive matrix, defined by $F = \underline{W} \otimes \underline{C}$, wherein $\underline{W}$ denote the transmit analog beamforming coefficients, $\underline{C}$ the receive analog beamforming coefficients and $\otimes$ the Kronecker product.

In an embodiment the wireless communication system is an Orthogonal frequency division multiplexing system In an embodiment the wireless communication system is a single-carrier system wherein frequency domain equalization is applied.

In an embodiment the plurality of antennas is preferably larger than the plurality of analog front-ends.

In another aspect of the disclosure a receiver device for use in a wireless communication system is presented. The receiver device comprises a plurality of receive antennas and at least two analog front-ends, an estimator arranged for determining information representative of communication channels formed between a receive antenna of the plurality of receive antennas and a transmit antenna of a plurality of transmit antennas of a transmitter device of the wireless communication system. The receiver device further comprises a controller arranged for calculating an optimized set of coefficients based on a beamforming cost function using the information obtained in the estimator and a set of initial coefficients representing the transmit and receive analog beamforming coefficients and taking into account the at least two analog front-ends. The estimator is further arranged for determining an estimate of the frequency responses of the communication channels. The controller is further arranged for calculating for each communication channel transmit digital beamforming coefficients and receive digital beamforming coefficients. The receiver device is also arranged for sending the optimized transmit beamforming coefficients to the transmitter device.

In yet a further aspect a transmitter device for use in a wireless communication system is presented. The transmitter device comprises a plurality of transmit antennas and at least two analog front-ends, an estimator arranged for determining information representative of communication channels formed between a transmit antenna of the plurality of transmit antennas and a receive antenna of a plurality of receive antennas of a receiver device of the wireless communication system. The transmitter device further comprises a controller arranged for calculating an optimized set of coefficients based on a beamforming cost function using the information obtained in the estimator and a set of initial coefficients representing the transmit and receive analog beamforming coefficients and taking into account the at least two analog front-ends. The estimator is further arranged for determining an estimate of the frequency responses of the communication channels. The controller is further arranged for calculating for each communication channel transmit digital beamforming coefficients and receive digital beamforming coefficients. The transmitter device is also arranged for sending the optimized receive beamforming coefficients to the receiver device.

BRIEF DESCRIPTION OF THE DRAWINGS

Presently preferred embodiments are described below in conjunction with the appended drawing figures, wherein like reference numerals refer to like elements in the various figures.

DETAILED DESCRIPTION OF CERTAIN ILLUSTRATIVE EMBODIMENTS

Figure 1:
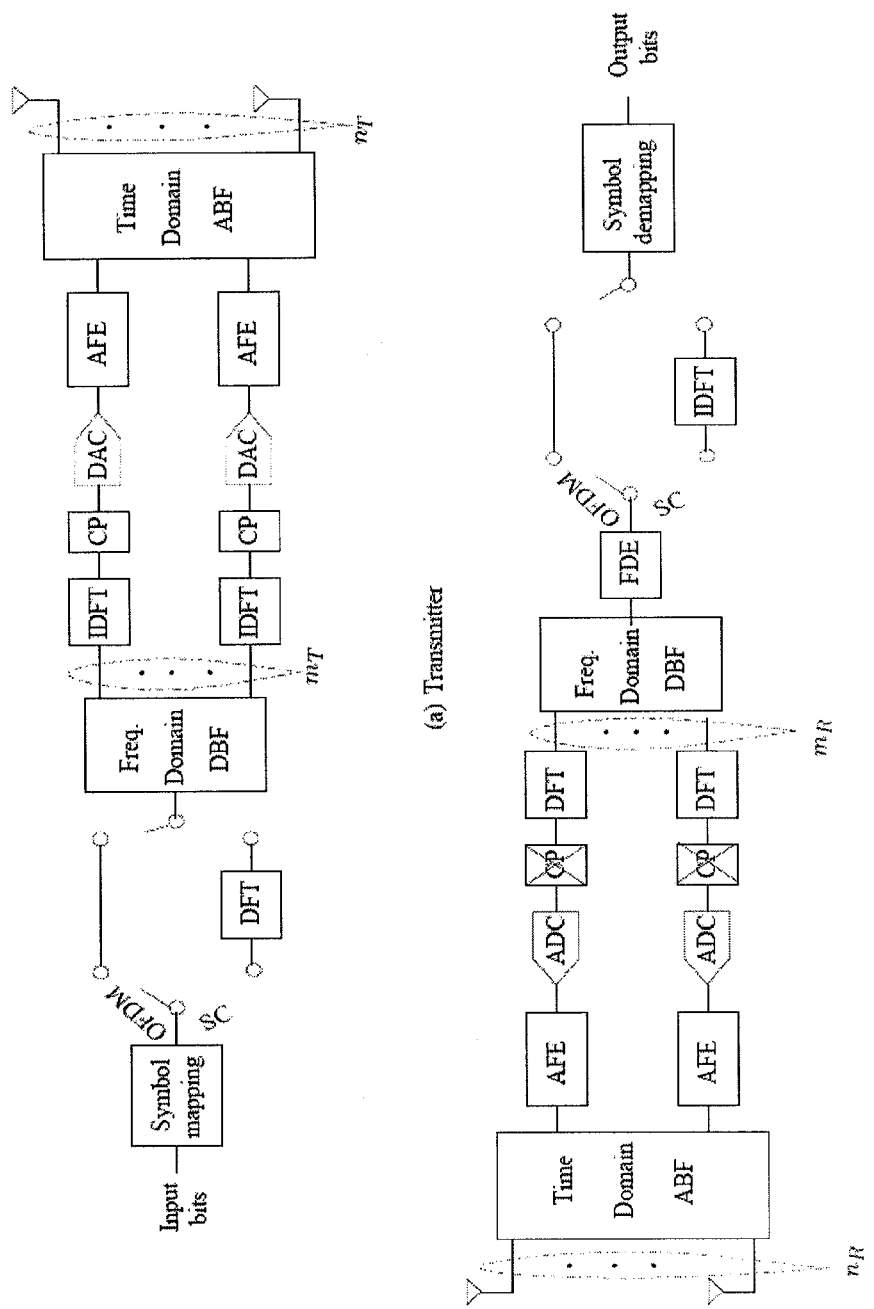
FIG. 1 represents schematically a MIMO transceiver with mixed analog and digital beamformers in one embodiment.

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes.

Furthermore, the terms first, second, third and the like in the description, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description are used for descriptive purposes and not necessarily for describing relative positions. The terms so used are interchangeable under appropriate circumstances and the embodiments of the disclosure described herein can operate in other orientations than described or illustrated herein.

The term "comprising" should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting of only components A and B. It means that with respect to the present disclosure, the only relevant components of the device are A and B.

A system and a method is proposed to compute jointly transmit-receive (TX-RX) mixed analog and digital BF weights for MIMO transceivers operating in frequency selective channels. The proposed algorithm is designed to maximize the average received signal-to-noise-ratio (SNR), therefore to increase the link budget. The performance of the proposed algorithm is evaluated considering the two air interfaces proposed at 60 GHz, namely orthogonal frequency division multiplexing (OFDM) and single carrier (SC) with frequency domain equalization (FDE).

Roman letters are used to represent scalars (x), single underlined letters to denote column vectors (x) and double underlined letters to represent matrices (X). Frequency domain signals are identified using a tilde on top (for example $\tilde{x}$). The notations $[.]^T$ and $[.]^H$ stand for transpose and complex conjugate transpose operators respectively. The expectation operator is denoted by $\epsilon[.]$. The symbol $\otimes$ denotes the Kronecker product. The Euclidean norm of a vector is represented by $\|x\|$. The notations $Tr[M]$ and $\lambda_i[M]$ represent the trace and the $i^{th}$ eigenvalue of a given matrix M, respectively. An identity matrix of size k×k is represented by $I_k$. The vec operator, which vectorizes a matrix by stacking its columns, is denoted by vec(.).

A block diagram of the multi-antenna transceiver is introduced in FIG. 1. On the one side, the transmitter has $n_T$ antenna elements and $m_T$ AFEs and DACs, with $1 \leq m_T \leq n_T$. On the other side, the receiver has $n_R$ antenna elements and $m_R$ AFEs and ADCs, with $1 \leq m_R \leq n_R$. Note that for the special case $m_T = m_R = 1$, only a frequency flat beamforming (BF) is carried out in the RF analog domain (ABF) while for the special case $m_T = n_T$ and $m_R = n_R$, only a frequency dependent BF is carried out in the digital baseband domain (DBF).

At the transmitter (FIG. 1(a)) the input bits are mapped to symbols according to the used modulation scheme. The symbols are then grouped in blocks of size N. If the transmission scheme is single-carrier with Frequency domain equalization (SC-FDE), a discrete Fourier transform (DFT) is applied to obtain the input symbols of the frequency domain DBF. In the case of Orthogonal frequency division multiplexing (OFDM), the symbols out of the mapper are directly used as input symbols to the frequency domain DBF. Afterwards, a pre-DBF per subchannel is carried out to get $m_T$ diversity signals, and then converted to time domain (by means of inverse discrete Fourier transform). Next, a cyclic prefix (CP) of size $N_{cp}$, larger than the discrete time channel impulse response (CIR), is appended to each signal to avoid interblock interference (IBI) caused by the multipath propagation and therefore enable FDE on per block basis. Each of the $m_T$ discrete-time baseband signals is then converted to analog by means of a digital to analog converter (DAC) and translated from baseband to RF in the analog front-end AFE. In the RF domain a pre-time domain ABF is carried out as a linear transformation from $m_T$ signals to $n_T$ signals, which are sent to the receiver.

At the receiver side (FIG. 1(b)) the received signals are first linearly transformed to get $m_R$ signals from the $n_R$ received signals on different antennas. This operation corresponds to a post time domain-ABF. Each of the $m_R$ signals is then translated from RF to analog and converted to digital. Then, the CP is removed. After the latter operation, the successive transmitted blocks are free of IBI. Each of the $m_R$ digital baseband signals is then converted to frequency domain using a DFT. A post-DBF per subchannel is carried out to get a single stream of received symbols, on which the multipath channel distortion is removed by FDE. Afterwards, if the transmission scheme is SC-FDE, an inverse DFT (IDFT) is performed to get symbols in the time domain. In the case of OFDM, since symbols are transmitted in frequency domain, one does not have to carry out this IDFT operation. Finally, the resulting received symbols are demapped to obtain received bits.

Model of Joint TX-RX Mixed Analog/Digital Beamforming

Focusing on the joint design of TX-RX mixed analog/digital beamformers, a system model (see FIG. 2) is derived from the MIMO transceiver block diagram represented in FIG. 1. Assuming that the cyclic prefix CP is chosen such that it is longer than the largest CIR of the MIMO channel, the communication of the single input single output (SISO) system obtained after joint TX-RX mixed analog/digital BF may be decomposed into a set of parallel and non-interfering subchannels in the frequency domain. Therefore, one has $$\tilde{y}[k] = \tilde{h}[k]\tilde{x}[k] + \tilde{v}[k] \quad k=1,\ldots,N \tag{1}$$

where $\tilde{y}[k]$ is the observation associated to the $k^{th}$ subchannel, $\tilde{h}[k]$ the frequency response in the $k^{th}$ subchannel after joint TX-RX mixed analog/digital BF, which is given by $$\tilde{h}[k] = \tilde{a}^H[k]\underline{C}^H\underline{\tilde{H}}[k]\underline{W}\tilde{b}[k] \quad k=1,\ldots,N \tag{2}$$

wherein $\tilde{b}[k]$ denotes a vector of length $m_T$ containing the TX DBF weights applied in the $k^{th}$ subchannel, W is a matrix of size $n_T \times m_T$ representing the TX ABF, C a matrix of size $n_R \times m_R$ representing the RX ABF, $\tilde{a}[k]$ vector of length $m_R$ containing the RX DBF weights applied in the $k^{th}$ subchannel. $\tilde{x}[k]$ is the signal transmitted in the $k^{th}$ subchannel. For an OFDM transmission scheme $\tilde{x}[k]$ corresponds to the symbols out the of the symbol mapping while for SC-FDE it is given by $$\tilde{x}[k] = \frac{1}{\sqrt{N}} \sum_{n=0}^{N-1} x[n] e^{-j2\pi nk/N} \tag{3}$$

where x[n] represents the symbol at the symbol mapper output.

$\tilde{v}[k]$ is the complex circular AWGN given by $$\tilde{v}[k] = \tilde{a}^H[k]\underline{C}^H\tilde{\underline{n}}[k] \tag{4}$$

where $\tilde{n}[k]$ is a vector containing the $k^{th}$ frequency components of AWGN on different received antennas.

Figure 2:
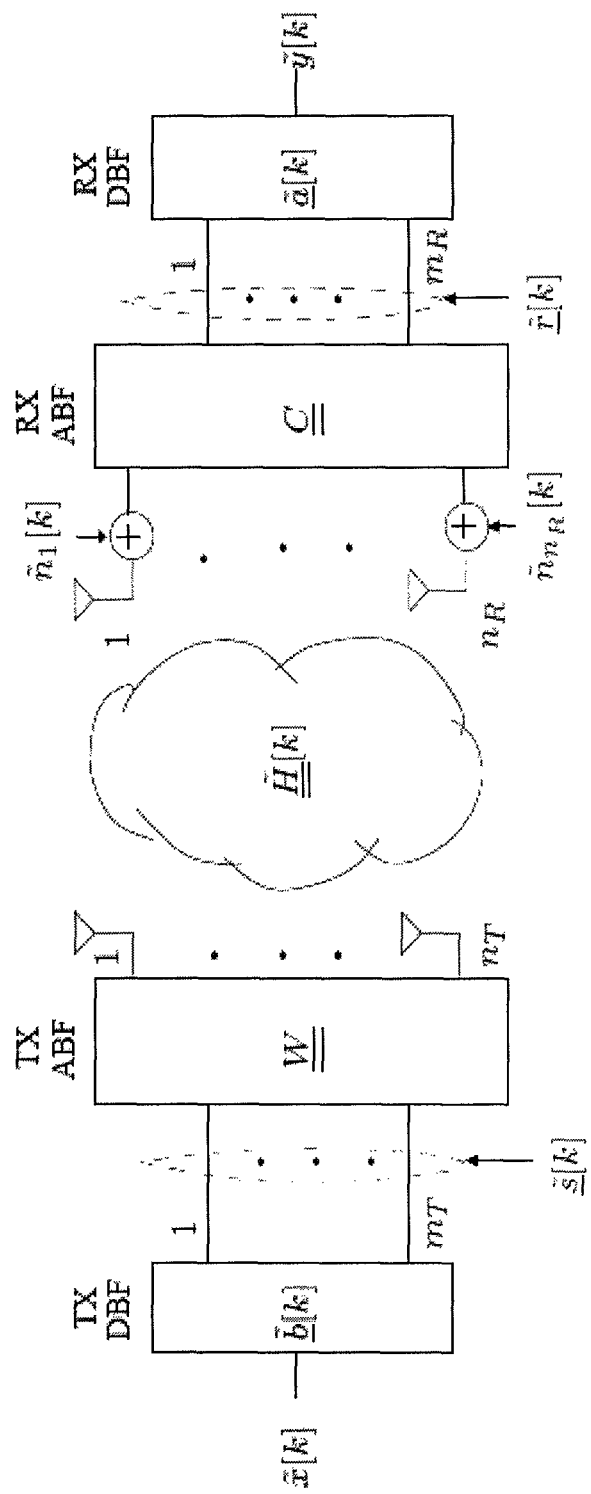
FIG. 2 illustrates an equivalent model of mixed analog/digital beamforming in a subchannel in one embodiment.

FIG. 2 also shows $\tilde{s}[k]$ which results when a per subcarrier DBF is carried out on the signal transmitted in the $k^{th}$ subchannel. The corresponding frequency domain information of the $m_R$-vector of the received signals at the $k^{th}$ subchannel is given by $\tilde{r}[k] = \tilde{G}[k]\tilde{s}[k] + C^H\tilde{n}[k]$, with $\tilde{G}[k]$ representing the equivalent digital MIMO channel of size $m_R \times m_T$, the channel is given by: $\tilde{G}[k] = C^H\tilde{H}[k]W$.

Beamforming Optimization Problem

The main problem of wireless communications at 60 GHz is the poor link budget. This results from the high path loss and the low output power of the power amplifier (PA) in this spectrum band. The consequence of a poor link budget is a lower received SNR, therefore a higher bit error rate (BER) and a lower achievable capacity. In order to solve this link budget problem using the multi-antenna architecture presented in FIG. 1, an expression of the average received SNR as a function of mixed frequency flat ABF and frequency selective DBF weights is derived. This expression constitutes a beamforming cost function.

Using successively Eq. (1), Eq. (2) and Eq. (4), the average SNR in the $k^{th}$ subchannel is given by $$\bar{\gamma}_k(\tilde{\underline{b}}[k], \underline{W}, \underline{C}, \tilde{\underline{a}}[k]) = \frac{\varepsilon[|\tilde{h}[k]\ \tilde{x}[k]|^2|]}{\varepsilon[|\tilde{v}[k]|^2]} \quad (5)$$

$$= \frac{\varepsilon[|\tilde{\underline{a}}^H[k]\underline{C}^H\ \tilde{\underline{H}}[k]\underline{W}\tilde{\underline{b}}[k]\tilde{x}[k]|^2]}{\varepsilon[|\tilde{\underline{a}}^H[k]\underline{C}^H\tilde{\underline{n}}[k]|^2]} \quad (6)$$

The average received SNR, denoted by $\Gamma$, is then defined as:

$$\Gamma = \frac{1}{N}\sum_k \bar{\gamma}_k(\tilde{\underline{b}}[k], \underline{W}, \underline{C}, \tilde{\underline{a}}[k]). \quad (7)$$

Taking into account the independent and identically distributed (i.i.d.) properties of $\tilde{x}[k]$ and $\tilde{n}_L[k]$, the average received SNR becomes $$\Gamma = \frac{\sigma_x^2}{\sigma_n^2}\sum_k \frac{\|\tilde{\underline{a}}^H[k]\underline{C}^H\ \tilde{\underline{H}}[k]\underline{W}\tilde{\underline{b}}[k]\|^2}{\|\underline{C}\tilde{\underline{a}}[k]\|^2}, \quad (8)$$

with $$\sigma_x^2 = \varepsilon[\tilde{x}[k]\tilde{x}^*[k]] \quad (9)$$

being the variance of the transmitted symbols for all k and $$\sigma_n^2\underline{I}_{n_R} = \varepsilon[\tilde{n}_L[k]\tilde{n}_L^H[k]] \quad (10)$$

where $\sigma_n^2$ the variance of the AWGN for all k.

A Joint TX-RX Mixed Analog/Digital Beamforming Algorithm

Some assumptions are formulated first. On the one hand, in order to keep the TX power constant, one uses a power constraint per subcarrier such that $|W\tilde{b}[k]|=1$ for all k. One way to comply with this constraint is to impose that $|\tilde{b}[k]|=1$ for all k and $$\underline{W}^H\underline{W} = \underline{I}_{m_T} \quad (11)$$

In such a way, neither TX DBF nor TX ABF introduce any power gain.

On the other hand, in order to compute the BF SNR gain relative to the system SNR measured at the output of every RX antenna element, $\underline{C}$ is subject to the following orthonormalization $$\underline{C}^H\underline{C} = \underline{I}_{m_R} \quad (12)$$

The TX-RX DBF weights per subchannel are computed jointly. The expression (8) is maximized by choosing the subchannel DBF weights $\tilde{b}[k]$ and $\tilde{a}[k]$t to be the right and left principal singular vectors of the product matrix $C^H\tilde{H}[k]W$, for all k. In this case the average received SNR is equal to $$\Gamma = (\underline{W}, \underline{C}) = \frac{\sigma_x^2}{\sigma_n^2}\sum_{k=0}^{N-1}\lambda_1\left[(\underline{C}^H\ \tilde{\underline{H}}[k]\underline{W})(\underline{W}^H\ \tilde{\underline{H}}^H[k]\underline{C})\right] \quad (13)$$

where $\lambda_1$ denotes the first (i.e. the largest) eigenvalue. This result shows that the two frequency flat ABF matrices C and W determine the maximum received SNR.

By assuming a joint TX-RX DBF per subchannel based on Singular Value Decomposition (SVD), the BF optimization problem reduces to $$\max_{\underline{W},\underline{C}}\sum_{k=0}^{N-1}\lambda_1\left[(\underline{C}^H\ \tilde{\underline{H}}[k]\underline{W})(\underline{W}^H\ \tilde{\underline{H}}^H[k]\underline{C})\right] \quad (14)$$

$$\text{subject to } \begin{cases} \underline{W}^H\underline{W} = \underline{I}_{m_T} \\ \underline{C}^H\underline{C} = \underline{I}_{m_R} \end{cases}.$$

The joint TX-RX ABF weights can be derived analytically. In other words, both optimum ABF matrices C and W are derived that maximize the average received SNR after joint TX-RX DBF per subchannel. The computation of TX-RX ABF weights is carried out in four main steps.

1) Bounding the First Eigenvalue:

Maximizing the first eigenvalue of a matrix as formulated in Eq. (14) is a non-linear optimization problem. Its lower bound can be defined by the trace. From the literature, for a given hermitian matrix M of size n×n, one has $$\frac{1}{n}Tr[M] \leq \lambda_1[M].$$

Therefore, the optimization problem to solve becomes $$\max_{\underline{W},\underline{C}}\sum_{k=0}^{N-1}Tr\left[(\underline{C}^H\ \tilde{\underline{H}}[k]\underline{W})^H(\underline{C}^H\ \tilde{\underline{H}}[k]\underline{W})\right] \quad (15)$$

2) Reformulation of the Optimization Problem:

Applying successively the properties of the trace and of the vec operator, being: $Tr[A^HB]=(vec[A])^H vec[B]$ and $vec(A\times B)=(B^T\otimes A)vec(X)$, the BF expression to be optimized can be rewritten, whereby the ABF matrices are grouped and can be defined as a composed matrix $\underline{F}=\underline{W}\otimes\underline{C}$.

$$\max_{\underline{W},\underline{C}}\sum_{k=0}^{N-1}\left(vec(\tilde{\underline{H}}[k])\right)^H(\underline{W}^*\otimes\underline{C})(\underline{W}^*\otimes\underline{C})^H vec(\tilde{\underline{H}}[k]) \quad (16)$$

Using the trace operator and its cyclic permutation property, the above expression is also equivalent to $$\max_{\underline{W},\underline{C}}Tr\left[(\underline{W}^*\otimes\underline{C})^H\underline{\Omega}(\underline{W}^*\otimes\underline{C})\right] \quad (17)$$

where $$\underline{\Omega} = \sum_{k=0}^{N-1}vec(\tilde{\underline{H}}[k])(vec(\tilde{\underline{H}}[k]))^H \quad (18)$$

is an hermitian matrix of size $(n_T\times n_R)\times(n_T\times n_R)$. This matrix represents the cross-inner product between different TX-RX channel impulse response (CIR) pairs.

3) Kronecker Product SVD:

At this point, the matrix $\underline{\underline{\Omega}}$ is factorized in a sum of Kronecker products. To achieve this, the Kronecker product singular value decomposition (SVD) is used $$\underline{\underline{\Omega}} = \sum_{i=1}^{n_T \times n_R} \underline{\underline{T}}_i \otimes \underline{\underline{R}}_i \qquad (19)$$

where $\underline{\underline{T}}_i$ and $\underline{\underline{R}}_i$ are hermitian matrices of size $n_T \times n_T$ and $n_R \times n_R$ respectively, for all i. Replacing (19) in (17), the expression to optimize becomes $$\max_{\underline{\underline{W}},\underline{\underline{C}}} \sum_{k=0}^{N-1} Tr\left[(\underline{\underline{W}}^* \otimes \underline{\underline{C}})^H \left(\sum_{i=1}^{n_T \times n_R} \underline{\underline{T}}_i \otimes \underline{\underline{R}}_i\right)(\underline{\underline{W}}^* \otimes \underline{\underline{C}})\right] \qquad (20)$$

After several mathematical manipulations, one can find $$\max_{\underline{\underline{W}},\underline{\underline{C}}} Tr[\underline{\underline{W}}^T \underline{\underline{D}}(\underline{\underline{C}}) \underline{\underline{W}}^*] \qquad (21)$$

with $$\underline{\underline{D}}(\underline{\underline{C}}) = \sum_{i=1}^{n_T \times n_R} Tr[\underline{\underline{C}}^H \underline{\underline{R}}_i \underline{\underline{C}}]\underline{\underline{T}}_i \qquad (22)$$

4) Computation of TX-RX ABF Weights:

According to the literature, the optimum $W_{opt}(C)$ for a given C (including the optimum) is the isomorphic matrix containing the first $m_T$ eigenvectors of $\underline{\underline{D}}(\underline{\underline{C}})$. If W is chosen in such a way, one gets $$Tr[\underline{\underline{W}}^T \underline{\underline{D}}(\underline{\underline{C}}) \underline{\underline{W}}^*] = \sum_{i=1}^{m_T} \lambda_i [\underline{\underline{D}}(\underline{\underline{C}})] \qquad (23)$$

The optimum C then is the one that maximizes the sum of the largest $m_T$ eigenvalues of $\underline{\underline{D}}(\underline{\underline{C}})$. The latter matrix has actually $n_T$ eigenvalues.

A lower bound optimization is used that consists of maximizing the sum of all eigenvalues of the sum (including the nT−mT small eigenvalues that are not needed). In this case, the optimization problem simplifies to:

$$\max_{\underline{\underline{C}}} Tr[\underline{\underline{D}}(\underline{\underline{C}})] = \max_{\underline{\underline{C}}} Tr\left[\sum_{i=1}^{n_T \times n_R} Tr[\underline{\underline{C}}^H \underline{\underline{R}}_i \underline{\underline{C}}]\underline{\underline{T}}_i\right] \qquad (24)$$

$$= \max_{\underline{\underline{C}}} Tr[\underline{\underline{C}}^H \underline{\underline{Z}} \underline{\underline{C}}], \qquad (25)$$

with $$\underline{\underline{Z}} = \sum_i Tr[\underline{\underline{T}}_i]\underline{\underline{R}}_i. \qquad (26)$$

Note that the matrix Z, which is of size $n_R \times n_R$, is perfectly known once the Kronecker SVD of the matrix $\underline{\underline{\Omega}}$ has been computed.

The optimization problem defined in (25) can be solved by known techniques. According to, for example, the Ky Fan Theorem which is well known in the art, the $\underline{\underline{C}}_{opt}$ is the isomorphic matrix containing the first $m_R$ eigenvectors of the matrix Z. Furthermore, $W_{opt}$ is obtained by computing the isomorphic matrix containing the first $m_T$ eigenvectors of the matrix $\underline{\underline{D}}(\underline{\underline{C}}_{opt})$.

The method for estimating jointly the mixed ABF/DBF weights comprises the following steps. As a first step, the cross-inner product matrix $\underline{\underline{\Omega}}$ given by Eq. (18) is estimated. This step yields information on the various communication channels between an antenna at the transmitter side and one at the receiver side. Then as a second step, the ABF matrices C and W are computed following the sequential steps (1 to 4) explained above. Once ABF matrices have been computed, the third step comprises estimating the frequency responses of the resulting $m_T \times m_R$ digital baseband MIMO channel $\tilde{G}[k]=C^H \tilde{H}[k] W \tilde{G}[k]$. Finally, for each subchannel, the corresponding joint TX-RX DBF weights are computed by SVD.

Below the proposed algorithm's complexity is evaluated in three different ways: by the amount of required channel state information (CSI), the number and complexity of different processing operations and the number and type of hardware blocks to be implemented.

A. Required CSI

The amount of CSI to be estimated varies depending on where the BF is carried out:

for the joint TX-RX ABF, knowledge is required of the Hermitian matrix $\underline{\underline{\Omega}}$ of size $(n_T \times n_R) \times (n_T \times n_R)$, for which only $(n_R \times n_T)(n_R \times n_T + 1)/2$ coefficients are to be estimated, thanks to its hermicity.

for the joint TX-RX DBF per subchannel, one must estimate the frequency response of the $m_R \times m_T$ MIMO channel.

B. Processing Operations

The complexity of the ABF processing is dominated by the Kronecker factorization of $\underline{\underline{\Omega}}$ of size $(n_T \times n_R) \times (n_T \times n_R)$. This can be translated in order of complexity by $O((n_T \times n_R)^2)$. Regarding the DBF processing, N SVDs of resulting digital matrices after ABF are computed. The complexity of each SVD is $O(\min(m_T \times m_R^2, m_R \times m_T^2))$.

C. Hardware Implementation

Figure 3:
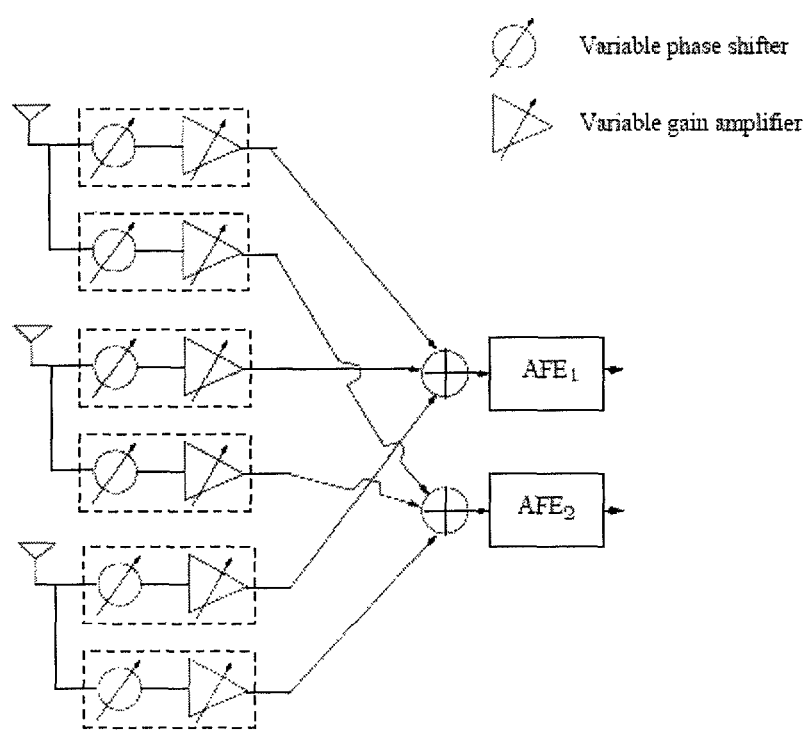
FIG. 3 illustrates a possible implementation of a receiver device in one embodiment.

For ABF the proposed solution requires $m_T$ and $m_R$ pairs of variable gain amplifier (VGA) and variable phase shifter (VPS) for each TX and RX antenna, respectively. Each VGA and VPS pair generates one complex scalar coefficient of either matrix C or either W. In total, the transceiver then has $m_T \times n_T + m_R \times n_R$ pairs of VGA and VPS. Furthermore, $m_R$ combiners at RX and $m_T$ splitters at TX are needed. FIG. 3 shows the ABF implementation of a 3-antenna wireless system with two AFE chains. For DBF the transceiver requires $m_T$ and $m_R$ AFE chains at TX and RX sides respectively, as opposed to $n_T$ and $n_R$ for the full DBF system.

As an example, an 8×8-MIMO wireless transceiver is presented operating at 60 GHz in an indoor non-line of sight (NLOS) environment. In order to evaluate the performances of the proposed mixed ABF/DBF algorithm, a set of 200 MIMO channel realizations have been generated. Each MIMO channel realization is generated as follows:

Each TX/RX pair CIR is generated using the 60 GHz NLOS multipath channel model.

The resulting MIMO channel is normalized such that the average received power is unitary.

The results are generated for a 60 GHz channel, but the proposed method is not limited to this frequency band: it can also be used in other frequency bands.

Performance Results in Experiments
1) Average Received SNR

Figure 4:
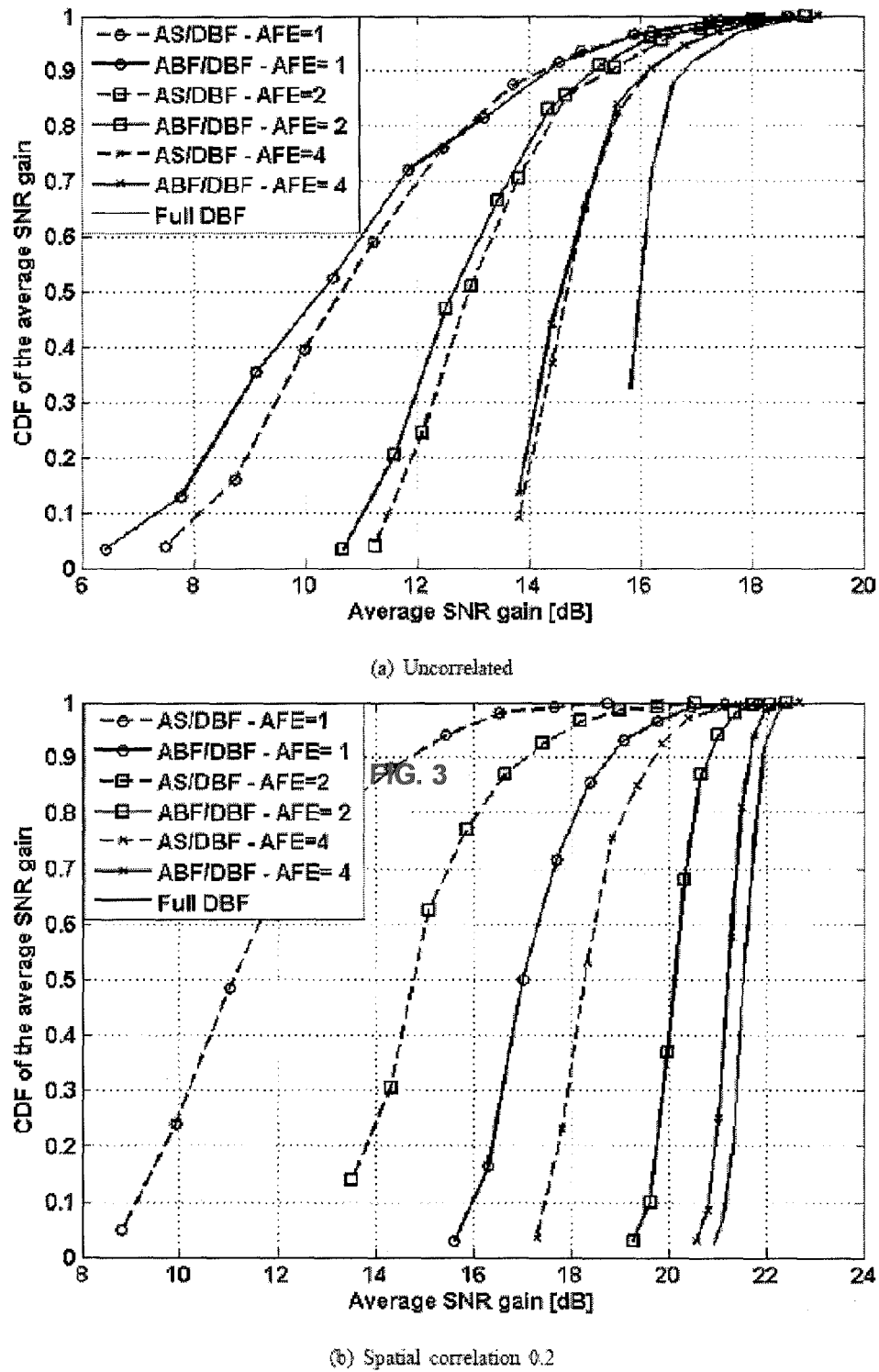
FIG. 4 shows plots of the cumulative distribution functions for different correlation values in one embodiment.

The cumulative distribution function (CDF) of the average received SNR (after joint TX-RX mixed ABF/DBF) is evaluated as a function of the number of AFE chains at both TX and RX sides. For simplification, the same number of AFE chains at TX and RX are considered. The results are presented in FIG. 4.

The performance of the proposed algorithm is compared to that of an exhaustive search AS with DBF. The upper figure represents a MIMO configuration where TX and RX antennas are uncorrelated while in the lower figure a spatial correlation equals to 0.2 is simulated. Without antenna spatial correlation, mixed AS/DBF performs a little bit better than the proposed mixed ABF/DBF. However, as spatial correlation increases between antennae, the benefits of ABF quickly show up. Indeed, with a spatial correlation equals to 0.2 at both sides, the proposed scheme outperforms the AS/DBF by 3, 4.5 and 5.5 dB with four, two and one AFE chains, respectively. Moreover, with four AFE chains at TX and RX, the average SNR gain of the proposed scheme is very close to that of a full DBF transceiver (i.e. with 8 AFE chains at TX and RX). This confirms the known result that the BF gain is higher as the correlation between antennas increases.

2) BER

Figure 5:
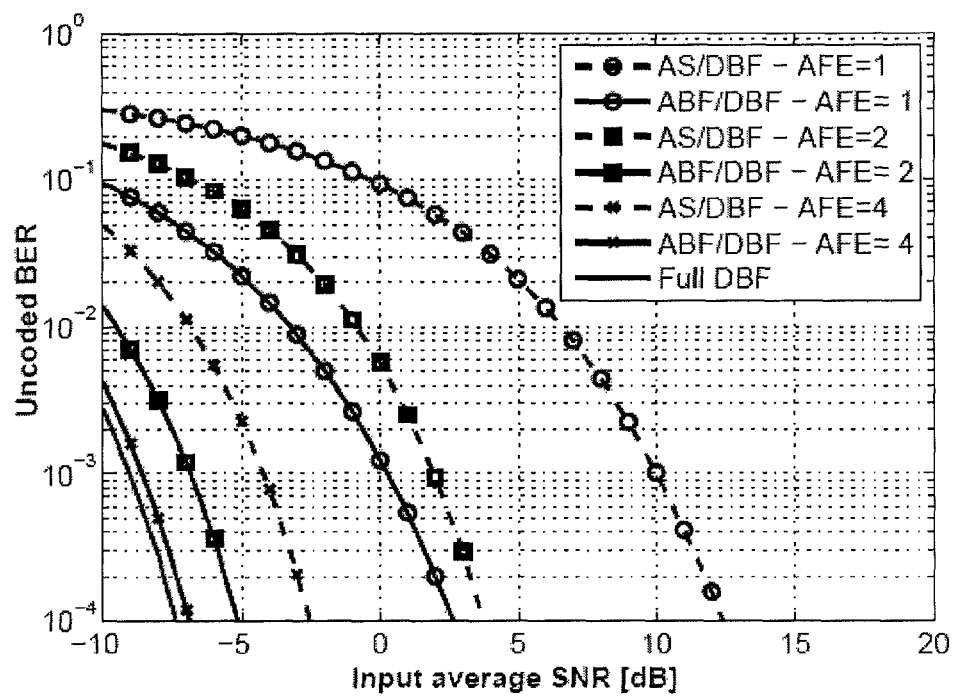
FIG. 5 shows plots the BER as a function of the average SNR for different air interfaces in one embodiment.
Figure 5:
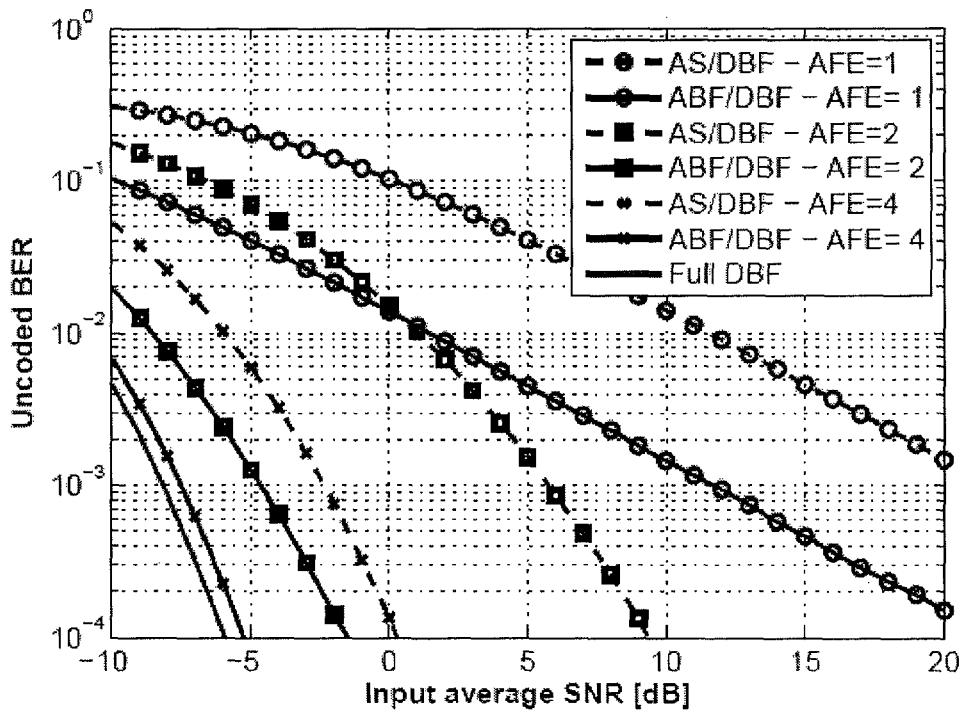
Figure 6:
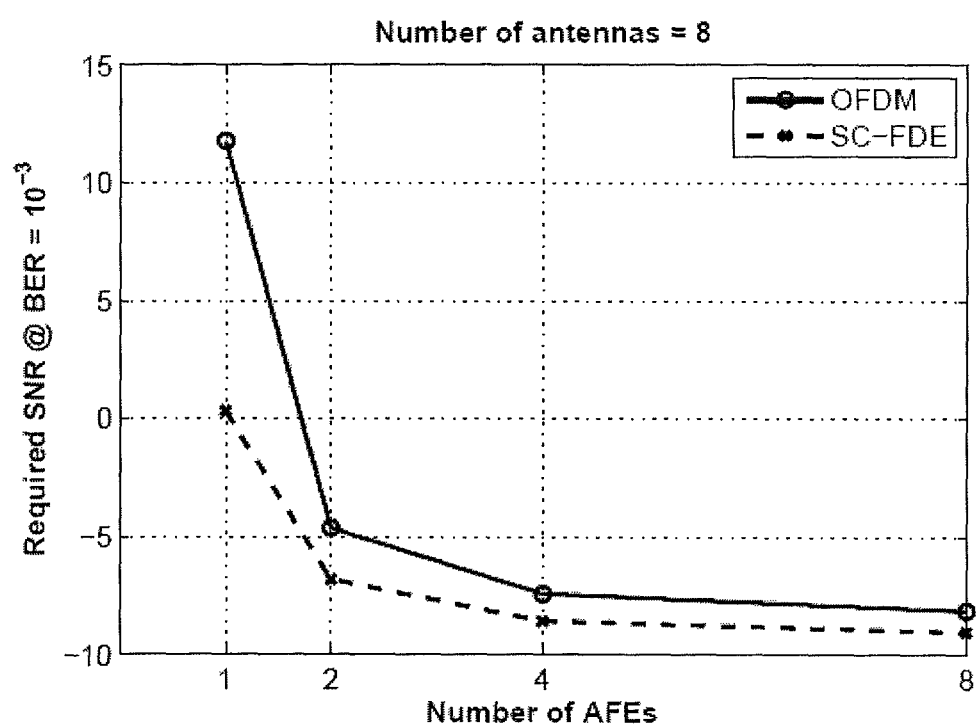
FIG. 6 shows a plot of the required SNR at a given BER as a function of the number of front-ends and this for different air interfaces in one embodiment.

Considering a spatial correlation equal to 0.2, the BER performances of both SC-FDE and OFDM transmission schemes combined with a QPSK modulation scheme have been evaluated and compared. The results are presented in FIG. 5. As expected, the proposed scheme (mixed ABF/DBF) outperforms the classical mixed AS/DBF for both SC-FDE and OFDM air interfaces. The performance gain increases as the number of AFE increases. Furthermore, in FIG. 6 the required input SNR to get a BER of $10^{-3}$ for SC-FDE and OFDM air interfaces are compared. The required SNR is lower in the case of SC-FDE. This is because the considered BF optimization criterion (average received SNR) is more advantageous for SC-FDE than for OFDM, since the former exploits the frequency diversity available in frequency selective channels by transmitting one symbol in the complete bandwidth while the latter does not since it transmits a different symbol in each subchannel. Note however that this gain reduces as the number of AFEs increases. An intuitive explanation may be that as the number of AFE increases, spatial diversity becomes more powerful than frequency diversity.

Figure 7:
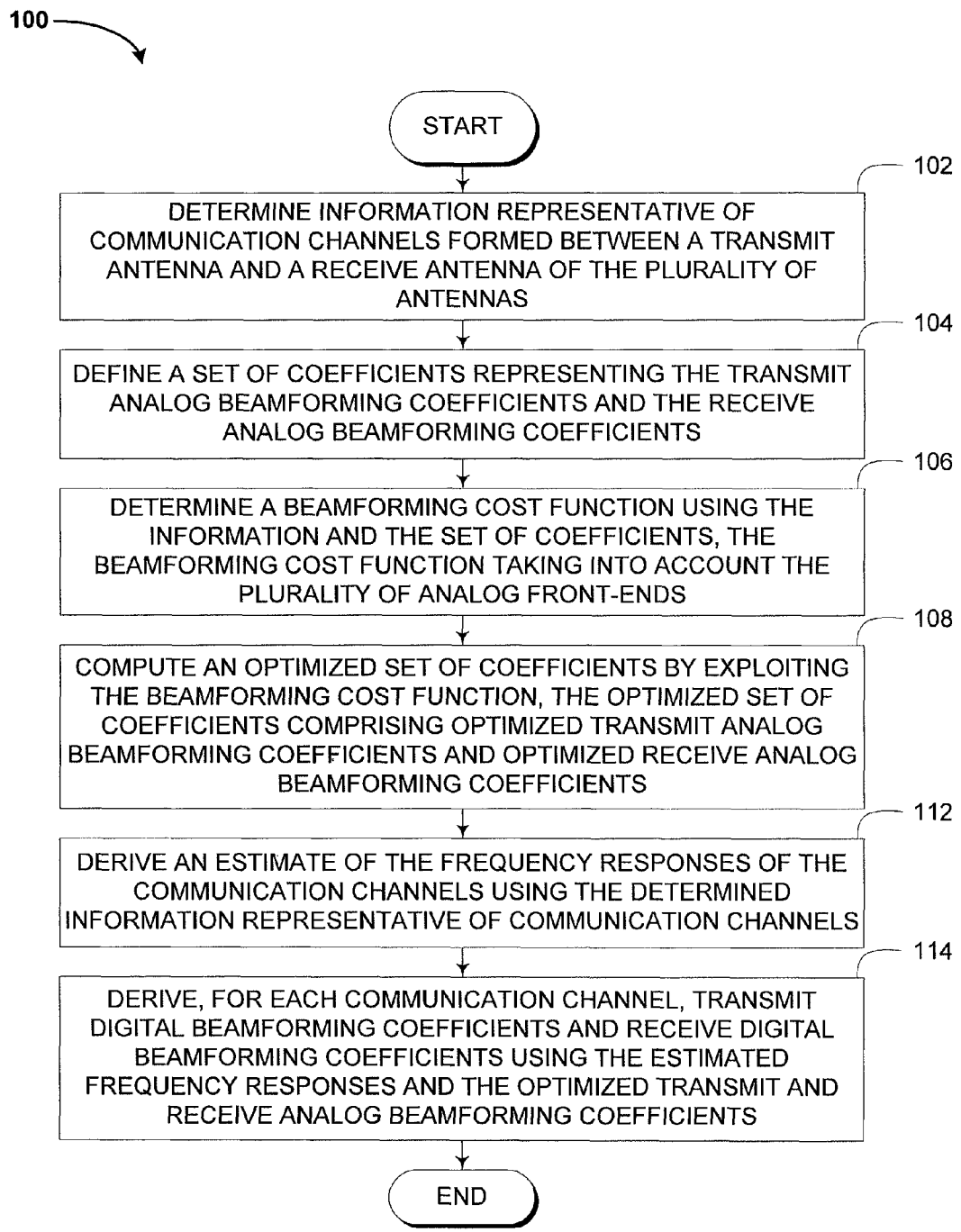
FIG. 7 shows a flowchart of one embodiment of a method of mixed analog/digital beamforming in a wireless communication system.

FIG. 7 shows a flowchart of one embodiment of a method of mixed analog/digital beamforming in a wireless communication system. The wireless system has a plurality of transmit antennas and receive antennas and a plurality of analog front-ends connected to the plurality of transmit and receive antennas, wherein at least two of the analog front-ends being connected to either the transmit antennas or the receive antennas. The method 100 includes determining transmit and receive analog beamforming coefficients and transmit and receive digital beamforming coefficients. The process of determining the beamforming coefficients starts at block 102 which includes determining information representative of communication channels formed between a transmit antenna and a receive antenna of the plurality of antennas. Next at block 104, a set of coefficients are defined representing the transmit analog beamforming coefficients and the receive analog beamforming coefficients. Moving to block 106, it includes determining a beamforming cost function using the information and the set of coefficients, the beamforming cost function taking into account the plurality of analog front-ends. Next at block 108, an optimized set of coefficients are computed by exploiting the beamforming cost function, the optimized set of coefficients comprising optimized transmit analog beamforming coefficients and optimized receive analog beamforming coefficients. Moving to block 112, it includes deriving an estimate of the frequency responses of the communication channels using the determined information representative of communication channels. The next block 114 includes deriving, for each communication channel, transmit digital beamforming coefficients and receive digital beamforming coefficients using the estimated frequency responses and the optimized transmit and receive analog beamforming coefficients.

Figure 8:
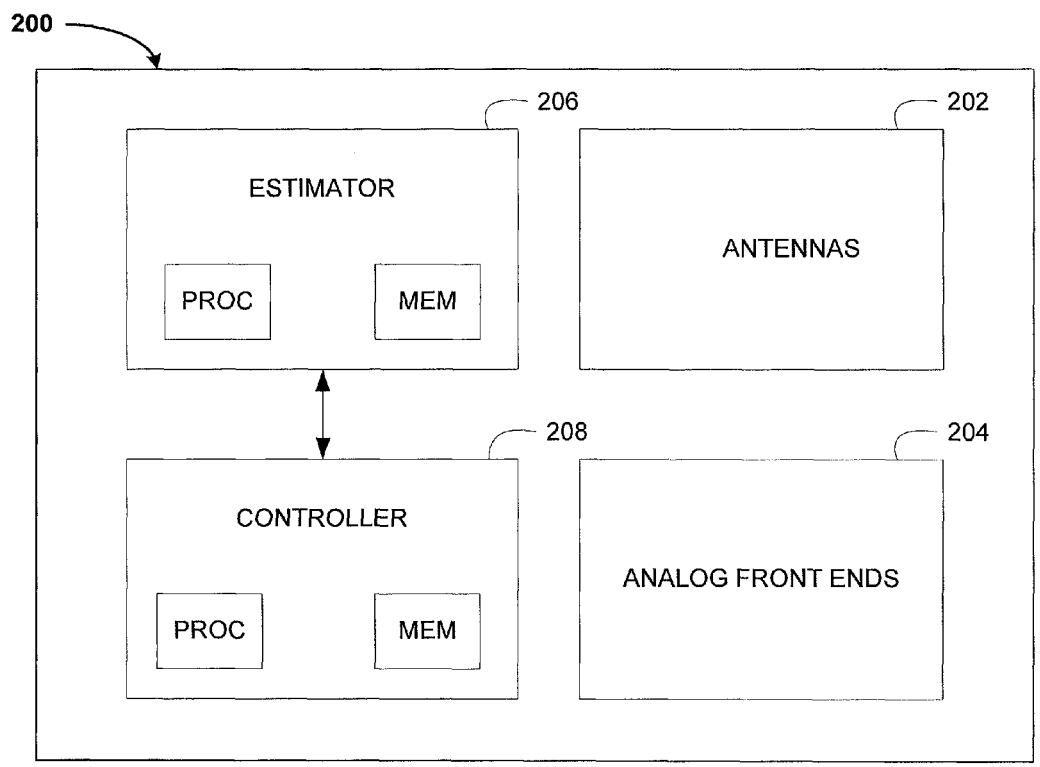
FIG. 8 shows a block diagram illustrating one embodiment of a receiver device for use in a wireless communication system.

FIG. 8 shows a block diagram illustrating one embodiment of a receiver device for use in a wireless communication system. The device 200 includes a plurality of receive antennas 202 and at least two analog front-ends 204. The device 200 also includes an estimator 206 configured to a) determine information representative of communication channels formed between a receive antenna of the plurality of receive antennas and a transmit antenna of a plurality of transmit antennas of a transmitter device of the wireless communication system, and b) determine an estimate of the frequency responses of the communication channels. The device 200 includes a controller 208 configured to a) calculate an optimized set of coefficients based on a beamforming cost function using the information obtained in the estimator and a set of initial coefficients representing the transmit and receive analog beamforming coefficients and taking into account the at least two analog front-ends, and b) calculate for each communication channel transmit digital beamforming coefficients and receive digital beamforming coefficients and to send the optimized transmit beamforming coefficients to the transmitter device.

In one embodiment, the estimator 206 and/or the controller 208 may optionally comprise a processor and/or a memory. In another embodiment, one or more processors and/or memories may be external to one or both modules. Furthermore, a computing environment may contain a plurality of computing resources which are in data communication.

Figure 9:
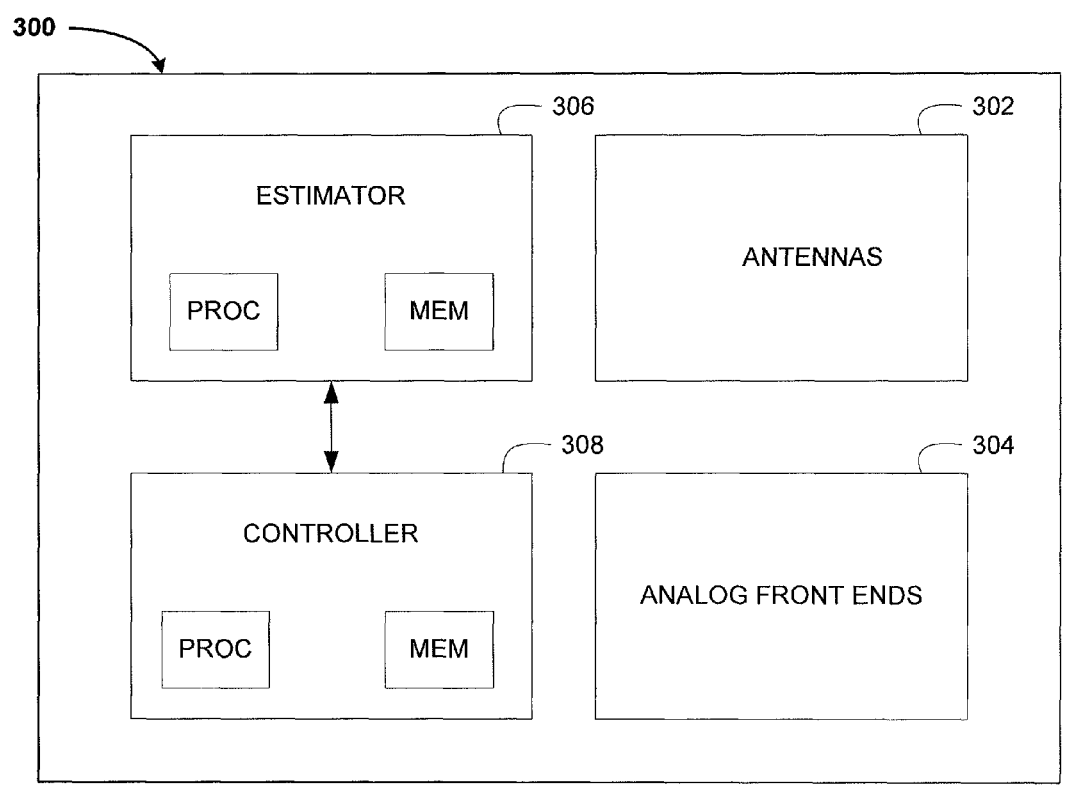
FIG. 9 shows a block diagram illustrating one embodiment of a transmitter device for use in a wireless communication system.

FIG. 9 shows a block diagram illustrating one embodiment of a transmitter device for use in a wireless communication system. The device 300 may include a plurality of transmit antennas 302 and at least two analog front-ends 304. The device 300 may further include an estimator 306 configured to a) determine information representative of communication channels formed between a transmit antenna of the plurality of transmit antennas and a receive antenna of a plurality of receive antennas of a receiver device of the wireless communication system, and b) determine an estimate of the frequency responses of the communication channels. The device 300 may further include a controller 308 configured to a) calculate an optimized set of coefficients based on a beamforming cost function using the information obtained in the estimator and a set of initial coefficients representing the transmit and receive analog beamforming coefficients and taking into account the at least two analog front-ends, and b) calculate for each communication channel transmit digital beamforming coefficients and receive digital beamforming coefficients and to send the optimized receive beamforming coefficients to the receiver device.

In one embodiment, the estimator 306 and/or the controller 308 may optionally comprise a processor and/or a memory. In another embodiment, one or more processors and/or memories may be external to one or both modules. Furthermore, a computing environment may contain a plurality of computing resources which are in data communication.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product stored in a computer-readable medium for execution by a programmable processor. Method steps of aspects of the invention may be performed by a programmable processor executing instructions to perform functions of those aspects of the invention, e.g., by operating on input data and generating output data. Accordingly, the embodiment includes a computer program product which provides the functionality of any of the methods described above when executed on a computing device. Further, the embodiment includes a data carrier such as for example a CD-ROM or a diskette which stores the computer product in a machine-readable form and which executes at least one of the methods described above when executed on a computing device.

The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

While the above detailed description has shown, described, and pointed out novel features of the disclosure as applied to various embodiments, it will be understood that various omissions, substitutions, and changes in the form and details of the device or process illustrated may be made by those skilled in the technology without departing from the scope of the disclosure. The scope of the invention is indicated by the appended claims rather than by the foregoing description. All changes which come within the meaning and range of equivalency of the claims are to be embraced within their scope.

What is claimed is:

1. A method of mixed analog/digital beamforming in a wireless communication system, the wireless system having a plurality of transmit antennas and receive antennas and a plurality of analog front-ends connected to the plurality of transmit and receive antennas, at least two of the analog front-ends being connected to either the transmit antennas or the receive antennas, the method comprising determining transmit and receive analog beamforming coefficients and transmit and receive digital beamforming coefficients, the process of determining the analog and digital beamforming coefficients comprising:

determining information representative of communication channels formed between a transmit antenna and a receive antenna of the plurality of antennas;

defining a set of coefficients representing the transmit analog beamforming coefficients and the receive analog beamforming coefficients;

determining a beamforming cost function using the information and the set of coefficients, the beamforming cost function taking into account the plurality of analog front-ends;

computing an optimized set of coefficients by exploiting the beamforming cost function, the optimized set of coefficients comprising optimized transmit analog beamforming coefficients and optimized receive analog beamforming coefficients;

deriving an estimate of the frequency responses of the communication channels using the determined information representative of communication channels; and deriving, for each communication channel, the transmit digital beamforming coefficients and receive digital beamforming coefficients using the estimated frequency responses and the optimized transmit and receive analog beamforming coefficients.

2. The method as in claim 1, wherein the process of determining a beamforming cost function taking into account the plurality of analog front-ends comprises bounding the beamforming cost function.

3. The method as in claim 1, wherein the process of determining information representative of communication channels comprises determining a channel pair matrix having elements representative of channel pair formed between a transmit antenna and a receive antenna of the plurality of antennas.

4. The method as in claim 3, wherein the channel pair matrix is defined by $$\underline{\Omega} = \sum_{k=0}^{N-1} vec(\underline{\tilde{H}}[k])(vec(\underline{\tilde{H}}[k]))^H$$

wherein N denotes the number of communication channels, $\tilde{H}[k]$ represents the frequency domain response of the k-th subchannel, $[.]^H$ stands for the complex conjugate transpose operator and vec denotes a matrix operator for creating a column vector.

5. The method as in claim 1, wherein the process of defining the set of coefficients representing the transmit and receive analog beamforming coefficients comprises defining a joint transmit and receive matrix, defined by $\underline{F}=\underline{W} \otimes \underline{C}$, wherein W denotes the transmit analog beamforming coefficients, C the receive analog beamforming coefficients and ⊗ the Kronecker product.

6. The method as in claim 1, wherein the wireless communication system is an orthogonal frequency division multiplexing system.

7. The method as in claim 1, wherein the wireless communication system is a single-carrier system wherein frequency domain equalization is applied.

8. The method as in claim 1, wherein the number of antennas is larger than the number of analog front-ends.

9. A receiver device for use in a wireless communication system, the device comprising:

a plurality of receive antennas;

at least two analog front-ends;

an estimator configured to determine information representative of communication channels formed between a receive antenna of the plurality of receive antennas and a transmit antenna of a plurality of transmit antennas of a transmitter device of the wireless communication system, the estimator being further configured to determine an estimate of the frequency responses of the communication channels; and a controller configured to calculate an optimized set of coefficients based on a beamforming cost function using the information obtained in the estimator and a set of initial coefficients representing the transmit and receive analog beamforming coefficients and taking into account the at least two analog front-ends, the controller being further configured to calculate for each communication channel transmit digital beamforming coefficients and receive digital beamforming coefficients and to send the transmit digital beamforming coefficients to the transmitter device.

10. The device as in claim 9, wherein the estimator is configured to determine a channel pair matrix having elements representative of channel pair formed between a transmit antenna of the plurality of transmit antennas and a receive antenna of the plurality of receive antennas.

11. The device as in claim 10, wherein the channel pair matrix is defined by $$\underline{\Omega} = \sum_{k=0}^{N-1} vec(\underline{\tilde{H}}[k])(vec(\underline{\tilde{H}}[k]))^H$$

wherein N denotes the number of communication channels, $\tilde{H}[k]$ represents the frequency domain response of the k-th subchannel, $[.]^H$ stands for the complex conjugate transpose operator and vec denotes a matrix operator for creating a column vector.

12. The device as in claim 9, wherein the wireless communication system is an orthogonal frequency division multiplexing system.

13. The device as in claim 9, wherein the wireless communication system is a single-carrier system wherein frequency domain equalization is applied.

14. A transmitter device for use in a wireless communication system, the device comprising:
a plurality of transmit antennas;
at least two analog front-ends;
an estimator configured to determine information representative of communication channels formed between a transmit antenna of the plurality of transmit antennas and a receive antenna of a plurality of receive antennas of a receiver device of the wireless communication system, the estimator being further configured to determine an estimate of the frequency responses of the communication channels; and
a controller configured to calculate an optimized set of coefficients based on a beamforming cost function using the information obtained in the estimator and a set of initial coefficients representing the transmit and receive analog beamforming coefficients and taking into account the at least two analog front-ends, the controller being configured to calculate for each communication channel transmit digital beamforming coefficients and receive digital beamforming coefficients and to send the receive digital beamforming coefficients to the receiver device.

15. The device as in claim 14, wherein the estimator is configured to determine a channel pair matrix having elements representative of channel pair formed between a transmit antenna of the plurality of transmit antennas and a receive antenna of the plurality of receive antennas.

16. The device as in claim 15, wherein the channel pair matrix is defined by $$\underline{\Omega} = \sum_{k=0}^{N-1} vec(\underline{\tilde{H}}[k])(vec(\underline{\tilde{H}}[k]))^H$$

wherein N denotes the number of communication channels, $\tilde{H}[k]$ represents the frequency domain response of the k-th subchannel, $[.]^H$ stands for the complex conjugate transpose operator and vec denotes a matrix operator for creating a column vector.

17. The device as in claim 14, wherein the wireless communication system is an orthogonal frequency division multiplexing system.

18. The device as in claim 14, wherein the wireless communication system is a single-carrier system wherein frequency domain equalization is applied.

19. A device for mixed analog/digital beamforming in a wireless communication system, the wireless system having a plurality of transmit antennas and receive antennas and a plurality of analog front-ends connected to the plurality of transmit and receive antennas, at least two of the analog front-ends being connected to either the transmit antennas or the receive antennas, the device comprising:
means for determining information representative of communication channels formed between a transmit antenna and a receive antenna of the plurality of antennas; and
means for computing an optimized set of coefficients by exploiting a beamforming cost function, the beamforming cost function determined using the information and a set of coefficients representing transmit analog beamforming coefficients and receive analog beamforming coefficients, the beamforming cost function taking into account the plurality of analog front-ends, the optimized set of coefficients comprising optimized transmit analog beamforming coefficients and optimized receive analog beamforming coefficients,
wherein the means for determining information includes means for deriving an estimate of the frequency responses of the communication channels using the determined information representative of communication channels, and
wherein the means for computing includes means for deriving, for each communication channel, the transmit digital beamforming coefficients and receive digital beamforming coefficients using the estimated frequency responses and the optimized transmit and receive analog beamforming coefficients.

* * * * *

UNITED STATES PATENT AND TRADEMARK OFFICE
CERTIFICATE OF CORRECTION

PATENT NO. : 8,619,886 B2
APPLICATION NO. : 13/112910
DATED : December 31, 2013
INVENTOR(S) : Nsenga et al.

Page 1 of 3

It is certified that error appears in the above-identified patent and that said Letters Patent is hereby corrected as shown below:

In the Specification

In column 3 at line 18 (approx.), change "$\underline{\tilde{H}[k]}$" to -- $\underline{\underline{\tilde{H}[k]}}$ --.

In column 3 at line 25, change "$\underline{F} = \underline{W} \otimes \underline{C}$," to -- $\underline{\underline{F}} = \underline{\underline{W}} \otimes \underline{\underline{C}}$, --.

In column 3 at line 25, change "$\underline{W}$" to --$\underline{\underline{W}}$--.

In column 6 at Lines 23 (approx.), change "$\overline{y}[k]$" to -- $\tilde{y}[k]$ --.

In column 6 at line 30 (approx.), change "$\underline{W}$" to --$\underline{\underline{W}}$--.

In column 6 at line 32 (approx.), change "vector" to --a vector--.

In column 6 at line 48, change "$\tilde{v}[k] = \underline{\tilde{a}}^H[k] \underline{C}^H \underline{\tilde{n}}[k]$" to -- $\tilde{v}[k] = \underline{\underline{\tilde{a}}}^H[k]\, \underline{\underline{C}}^H\, \underline{\underline{\tilde{n}}}[k]$ --.

In column 6 at line 56, change "$\tilde{r}[k] = \underline{\tilde{G}}[k]\underline{\tilde{s}}[k] + \underline{C}^H\underline{\tilde{n}}[k], \text{with}\, \underline{\tilde{G}}[k]$" to -- $\underline{\tilde{r}}[k] = \underline{\underline{\tilde{G}}}[k]\underline{\tilde{s}}[k] + \underline{\underline{C}}^H\underline{\underline{\tilde{n}}}[k], \text{with}\, \underline{\underline{\tilde{G}}}[k]$ --.

Signed and Sealed this
First Day of July, 2014

Michelle K. Lee
*Deputy Director of the United States Patent and Trademark Office*

CERTIFICATE OF CORRECTION (continued)
U.S. Pat. No. 8,619,886 B2

In column 6 at line 58, change "$\tilde{G}[k] = C^H \tilde{H}[k] W.$" to -- $\tilde{G}[k] = \underline{\underline{C}}^H \underline{\underline{\tilde{H}}}[k] \underline{\underline{W}}.$ --.

In column 7 at line 28, change "$\Gamma = \frac{\sigma_x^2}{\sigma_n^2} \sum_k \frac{\| \tilde{a}^H[k] \underline{C}^H \underline{\tilde{H}}[k] \underline{W} \tilde{b}[k] \|^2}{\| \underline{C} \tilde{a}[k] \|^2},$" to -- $\overline{\Gamma} = \frac{\sigma_x^2}{\sigma_n^2} \sum_k \frac{\left\| \tilde{a}^H[k] \underline{\underline{C}}^H \underline{\underline{\tilde{H}}}[k] \underline{\underline{W}} \underline{\tilde{b}}[k] \right\|^2}{\left\| \underline{\underline{C}} \, \underline{\tilde{a}}[k] \right\|^2},$ --.

In column 8 at line 43 (approx.), change "$(B^T \otimes A)$" to -- $(B^T \otimes A)$ --.

In column 9 at line 2, change "$\underline{\Omega}$" to -- $\underline{\underline{\Omega}}$ --.

In column 9 at line 11, change "$\underline{T_i} \text{ and } \underline{R_i}$" to -- $\underline{\underline{T}}_i \text{ and } \underline{\underline{R}}_i$ --.

In column 9 at line 35 (approx.), change "$D(\underline{C}). \text{If } \underline{W}$" to -- $\underline{\underline{D}}(\underline{\underline{C}}). \text{If } \underline{\underline{W}}$ --.

In column 9 at line 55, change "$= \max_{\underline{C}} Tr[\underline{C}^H Z \underline{C}],$" to -- $= \max_{\underline{\underline{C}}} Tr[\underline{\underline{C}}^H \underline{\underline{Z}} \, \underline{\underline{C}}],$ --.

In column 9 at line 62, change "$\underline{Z},$" to --$\underline{\underline{Z}}$,--.

In column 10 at line 2, change "$\underline{Z}.$" to --$\underline{\underline{Z}}$.--.

In column 10 at line 2, change "$\underline{W}_{opt}$" to -- $\underline{\underline{W}}_{opt}$ --.

In column 10 at line 4, change "$D(\underline{C}_{opt}).$" to -- $\underline{\underline{D}}(\underline{\underline{C}}_{opt}).$ --.

In column 10 at line 10, change "$\underline{C}$" to --$\underline{\underline{C}}$--.

CERTIFICATE OF CORRECTION (continued)
U.S. Pat. No. 8,619,886 B2

In column 10 at line 15, change "$\tilde{G}[k] = C^H \tilde{H}[k] W \tilde{G}[k].$" to --$\underline{\tilde{G}}[k] = \underline{C}^H \underline{\tilde{H}}[k] \underline{W} \underline{\tilde{G}}[k].$--.

In column 10 at line 36, change "$\underline{\Omega}$" to --$\underline{\underline{\Omega}}$--.

In column 10 at line 47, change "C or either W." to --C or either W.--.

In the Claims

In column 14 at line 42, in claim 5, change "W" to --W--.

In column 14 at line 43, in claim 5, change "C" to --C--.